United States Patent Office 3,623,300
Patented Nov. 30, 1971

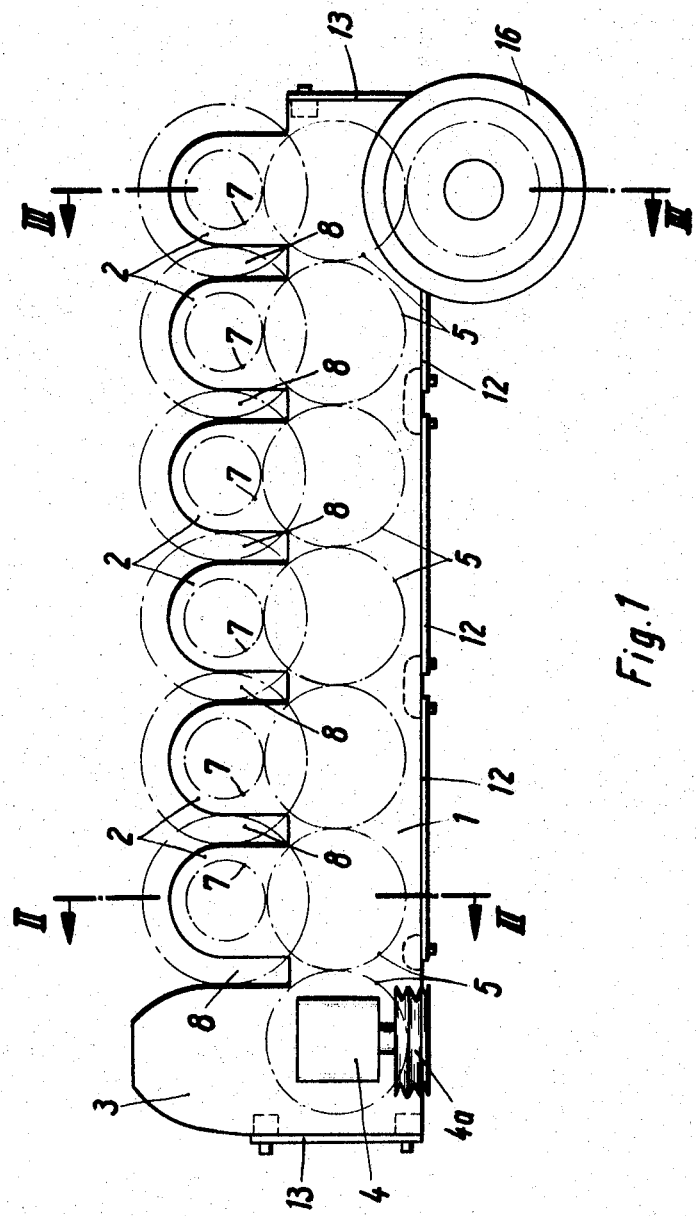

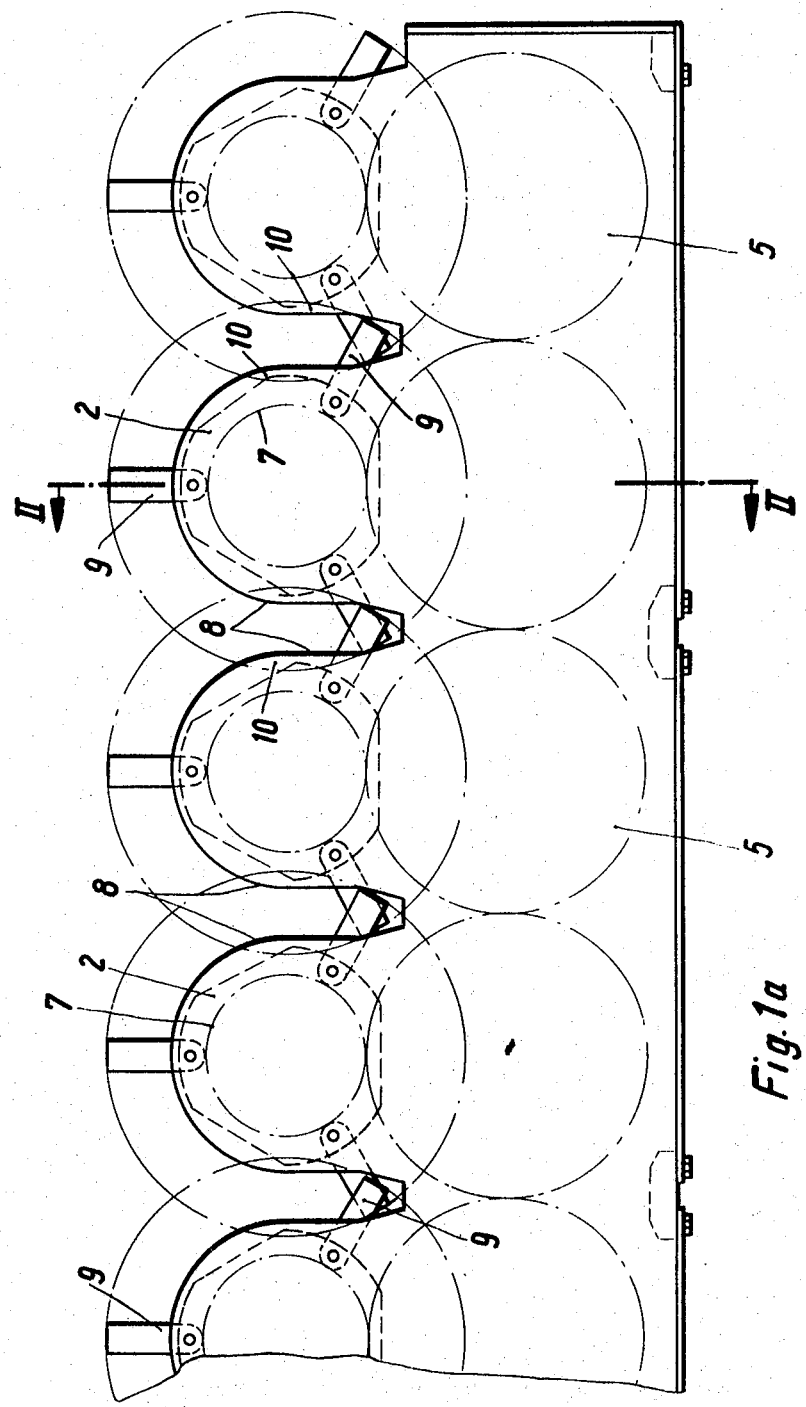

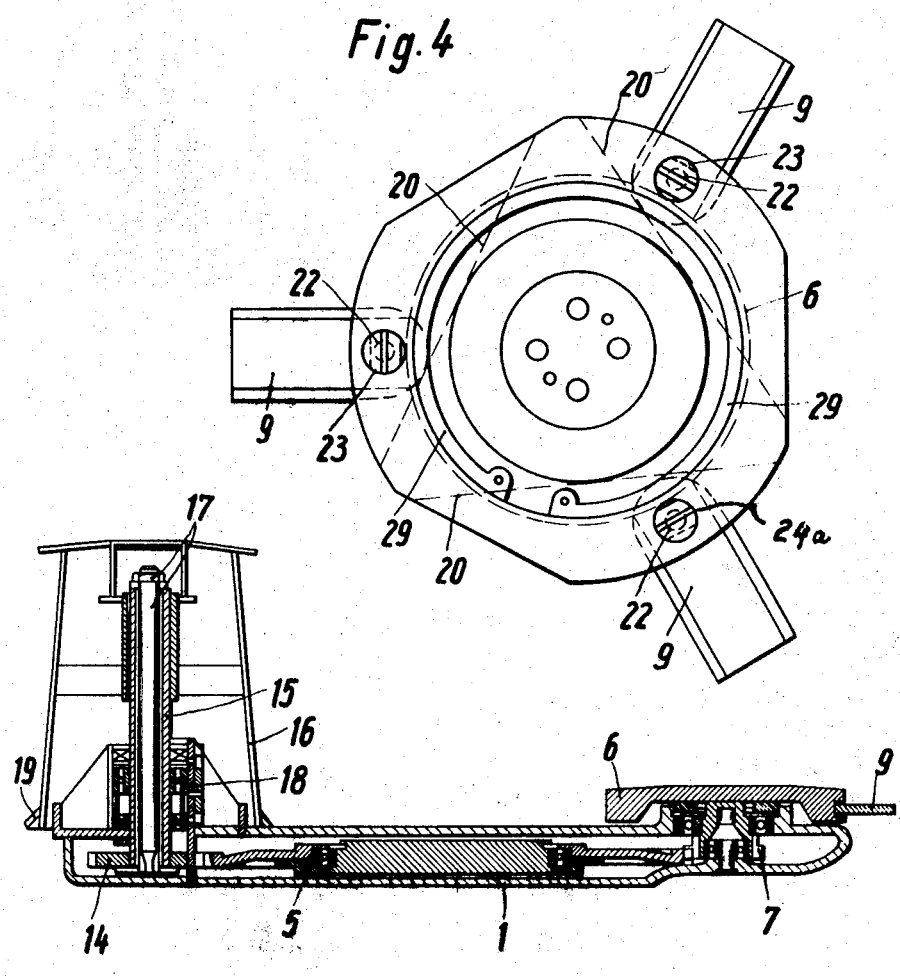

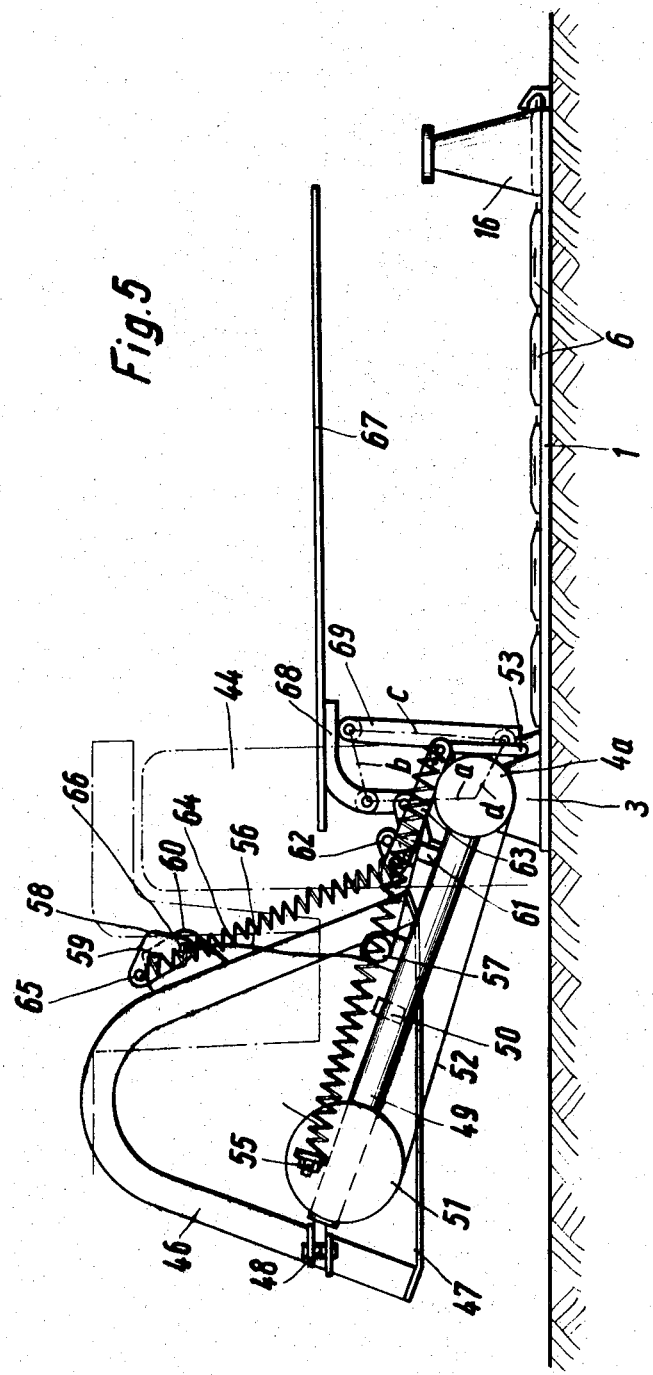

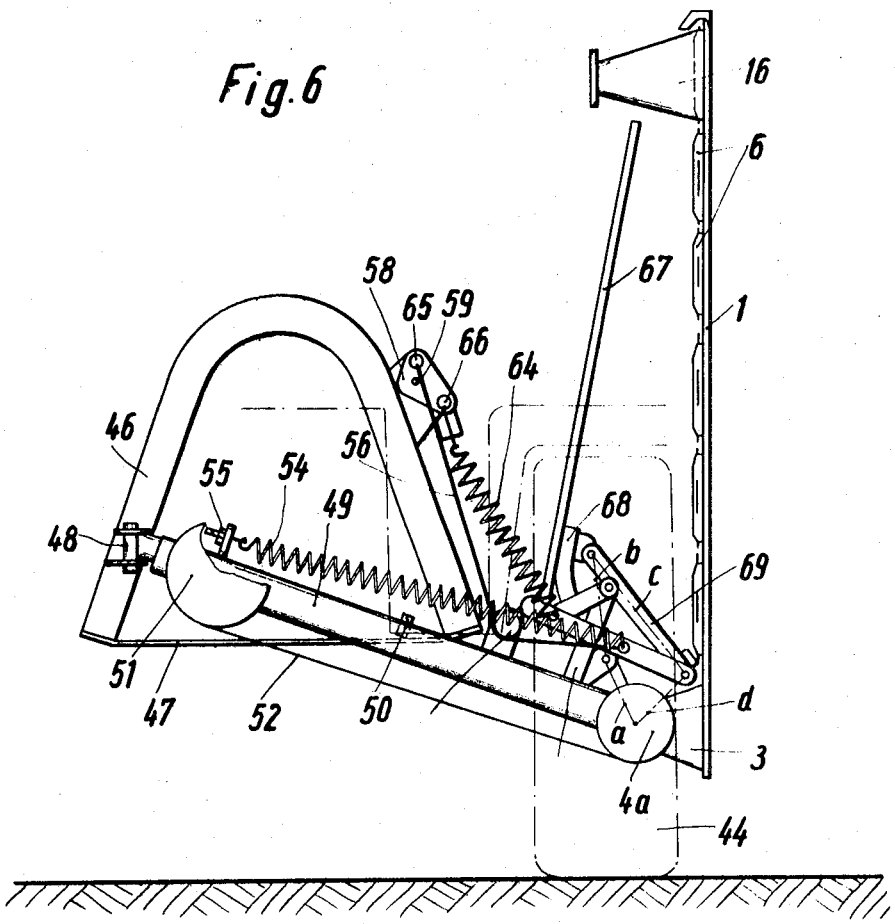

3,623,300
MOWING MACHINE
Karl-Heinz König and Antonius Hüntrup, Essen, Germany, assignors to H. Vissers N.V., Nieuw-Vennep, Netherlands
Filed Jan. 30, 1969, Ser. No. 795,296
Claims priority, application Germany, Jan. 31, 1968, P 16 32 811.3; Nov. 16, 1968, P 18 09 273.4
Int. Cl. A01d 75/30
U.S. Cl. 56—6                    5 Claims

ABSTRACT OF THE DISCLOSURE

A mowing machine adapted to be attached to a vehicle, as a tractor or the like, which comprises a carrier including cutter discs mounted thereon for rotation about a vertical axis and to overlap each other in their operating areas. A plurality of gear wheels is disposed inside of the carrier and extends to its outer end for rotating the cutter discs, and a plurality of cutter gear wheels is provided, each meshing the corresponding of the gear wheels.

---

The present invention relates to a free-cutting mowing machine with a drawing device which can be mounted on a vehicle, such as a tractor or the like, and has a carrier designed as a beam and cutter discs located thereon, each being rotatable about a vertical axis and overlapping one another in their working areas.

Free-cutting mowing machines are known, which are only suitable for use as rear mowing machine with high power consumption. These mowing machines comprise rotating drums which are arranged in pairs and oppositely directed and driven from the top. At the lower end of the drums are located exchangeable centrifugal blades. The material to be mown is cut by blades which rotate at a relatively high speed, and must be conveyed between the drums. The conveying of the material consumes a great deal of energy and furthermore has the disadvantage that the cut material is crushed and cannot be deposited in swaths.

It is one object of the present invention to provide a free-cutting mowing machine, which can be used as a rear mowing machine, as well as a side mowing machine and whose power consumption is as low as possible. In addition thereto the disadvantage of the known mowing machines is overcome. For this purpose it is especially necessary to avoid the carrying of material, which hinders efficient cutting. The gravitational forces of the mowing machine are kept as low as possible and the individual parts are rapidly and simply exchangeable.

It is another object of the present invention to provide a mowing machine, which includes at the inside of the carrier a series of gear wheels extending to the outside end, for the drive of the cutter discs, each cutter disc being in connection, independently on the remaining cutter discs, with the series of gear wheels over associated intermediate gear wheels.

It is still another object of the present invention to provide a mowing machine wherein a carrier has on the front side and distributed over its length projections, which are spaced from each other and on which the cutter discs are mounted. The projections extend forwardly over the overlapping area of the adjacent cutter discs.

It is yet an object of the present invention to provide a mowing machine, wherein the blade drive in the carrier is formed by a series of gear wheels composed of equally sized gear wheels, each of the gear wheels being located in the central axis of a projection and meshing with a corresponding smaller blade drive axis located in the projection. Depending on the requirements, it is possible to associate a clearing or swath drum at the opposite side of the carrier which is in driving connection with one of the gear wheels.

It is also an object of the present invention to provide a mowing machine, wherein the carrier with the projection on its front side is formed of an all-round oiltight seal and a flat hollow member which is resistent to bending and which at its narrow rear side, has oblong mounting apertures opposite to the projections and closed by lids, for fitting and removing the driving gear wheels for the cutter discs. In order to make possible a quick and rational exchange of worn parts, the length of the oblong mounting apertures always corresponds approximately to the width of two projections.

With these and other objects in view which will become apparent in the following detailed description the present invention, which is shown by example only, will be clearly understood in connection with the accompanying drawings, in which:

FIG. 1 is a schematic top plan view of the mowing machine of the present invention;

FIG. 1a is a fragmentary top plan view of FIG. 1 at an enlarged scale;

FIG. 3 is a section along the lines III—III of FIG. 1 through the clearing or swath drum;

FIG. 4 is a top plan view of a cutter disc provided with three centrifugal blades;

FIG. 5 is an elevation of the machine indicating the application of the mowing machine according to the present invention as a rear mowing machine on a tractor, the cutter and the projection for the blades being in operative position; and FIG. 6 is an elevation of the same mowing machine in its inoperative position, i.e. in a raised position.

Figure 2:
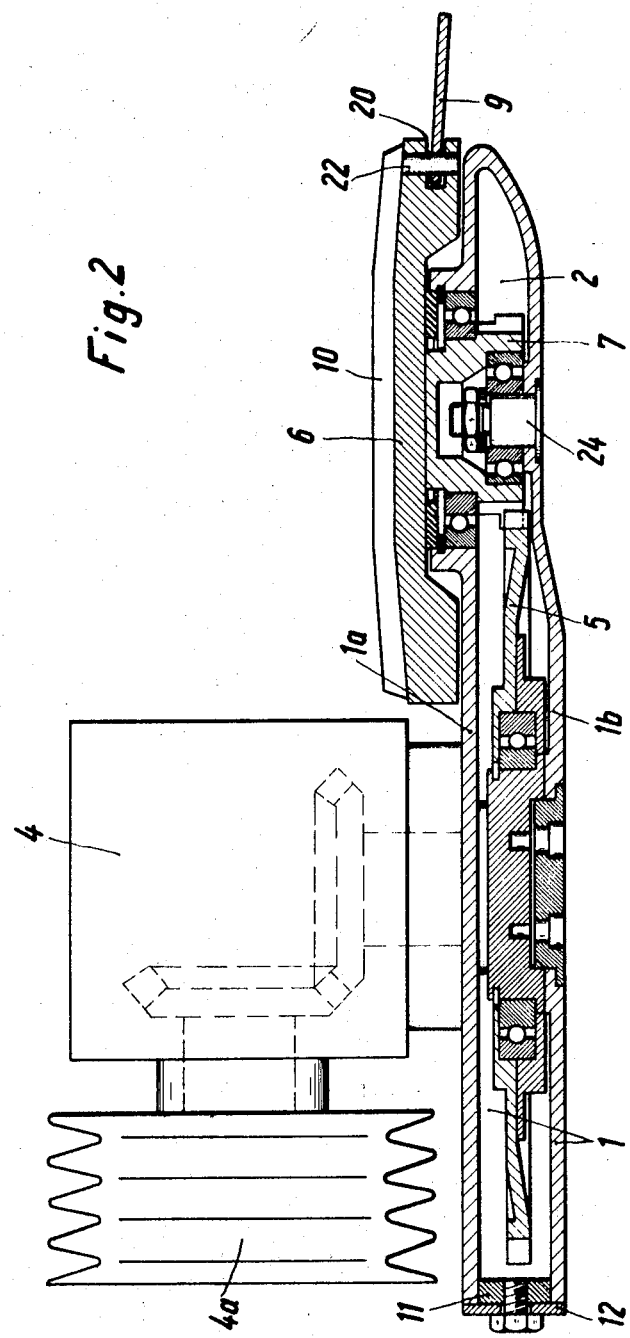
FIG. 2 is a section along the lines II—II of FIG. 1, at an enlarged scale.

Referring now to the drawings, the mowing machine comprises a horizontally extending hollow carrier 1. The latter has projections 2, recesses or the like. When used as side or rear mower, a conventional inside shoe 3 is provided on the inner side. Near to the inside shoe 3 is provided a multiplication gear 4, a hydraulic motor or the like. The illustrated design of the mowing machine, as side or rear mower, is driven by means of cone belts, a driving shaft, a hydraulic mechanism or the like. However, it is also possible to supply the mowing machine with its own driving means or alternatively to provide a driving means on each of the cutter discs.

The driving gears 5 are housed in the hollow carrier 1 and engage directly with one another, so as to form a series of gear wheels 5. The cutter discs 6 are located directly in front of the driving gear wheels 5 on the projections 2. The cutter discs 6 are mounted on axles 24 on which cutter driving gear wheels 7 are rotably arranged, which engage with the corresponding driving gear wheels 5. Advantageously the cutter driving gear wheels 7 have a considerably smaller diameter than the driving gear wheels 5.

Between the projection 2 are provided recesses 8, open areas, gaps, clearances or the like, which extends rearwards into the carrier 1. The width of these recesses 8 corresponds at least with the working scope of the cutter disc 6 with the blades 9. Advantageously the cutter discs 6 are provided with centrifugal blades 9. Preferably the gaps 8 extends so far into the carrier 1 that a large portion of the exterior circumference of the rotating centrifugal blades 9 remains free. The geometry of the gaps 8 must, however, include at least the depth of the overlapping portion of the rotating centrifugal blades 9. Hence carrying of the material cannot occur at these places. Advantageously the centrifugal blades 9 extend near to the adjacent projection 2 and their ends partly overlap the latter and thus the adjacent projections 2 from fixed counter members for the rotating cutter ends. Displacement of the cutter discs 6 with respect to the driving gear wheels 5 makes possible the achievement of the high circumferential speed of the centrifugal blades 9 required for satisfactory cutting only at the cutter driving gear wheels 7 or of the cutter discs 6. Thus the gravitational forces are kept small, which results in the mowing machine having an especially low power consumption.

For conveyance of the cut material, the cutter discs 6 may be provided with profiles, ribs 10, edges or the like. The cut material is not crushed but is loosely placed over the cutting width.

The carrier 1 is substantially formed of a box, which is oiltight on all sides and which can be cast from one piece or can be composed of two substantially equally sized plates, namely a cover plate 1a, and a base plate 1b, which plates 1a and 1b are welded together. The cover plate 1a is arranged above the base plate 1b, so that there is just space to interpose the driving members between the plates. At the front edge, and partcularly near the projections 2 the base plate 1b is shaped as an upward curving ski-shaped butting face.

For the fitting of the gear wheels, mounting apertures 11 are provided at the rear of the carrier 1 formed by the plates 1a and 1b, and the latter are sealed oiltight with screwed lids 12.

As is particularly noticeable from FIG. 1, the mounting apertures 11 always have a length of two projection-widths, that is the driving gear wheels 5 for two adjacent cutter discs 6 can be fitted through the same aperture. A similar mounting aperture is provided on the interior and exterior side of the mower cutter bar and is sealed oiltight with a lid 13.

This particular construction of the carrier 1 ensures complete protection of the gearing units from contamination by the moving material and soil, and furthermore makes the gearing members easily accessible.

According to FIGS. 1 and 6, a so-called clearing and swath drum 16 is arranged at the outer side of the carrier 1, which throws or moves the cut material inwards from the side and ensures that the cut material does not pile up at this point, and furthermore that the cut material is not placed on the ground at this point, so that during the next working process, the inside shoe 3 and the tractor wheels can be guided along this clear strip of ground without the cut material being damaged or pressed into the ground.

The clearing and swath drum 16 is located on the side opposite the projections 2 at the end of the carrier 1. The clearing and swath drum 16 can be freely and rotatably mounting on a vetrical axis and, if required, may be provided with a free-running gear, so that the drum 16 is rotated only in one direction by the cut material.

In the embodiment illustrated in FIGS. 1 and 3 the clearing and swath drum 16 is forcibly driven by a series of gear wheels or by one of the driving gear wheel 5. In addition to the clearing and swath drum 16 on the exterior side, which replaces or supplements the conventional outside shoe, another clearing and swath drum 16 can be provided at any chosen point of the series of gear wheels 5 e.g. in the center of the carrier 1 or on its inside near the inside shoe 3. Thus it is possible to make the swath drums especially close together.

The clearing and swath drum 16 comprises substantially the relatively small gear 14, which meshes with one of the driving gear wheels 5 and a hollow bearing shaft 15 fixed to the latter and extended in vertical direction, which at its outer end is connected to the actual jacket 16 of the drum 16 and at the other end by means of interposed ball bearings is located in a vertical bearing 18 of the carrier 1 and is located by a shaft bearing in the direction of its oblong axis. On its external side the clearing and swath drum 16 is provided, in addition to packing strips 19, with projections or the like (not illustrated) which ensure that the cut material is guided over the carrier 1.

According to FIG. 4 the cutter discs 6 have on their circumference slots 20 which are slightly inclined to the circumferential plane of the cutter discs 6 and in which the centrifugal blades 9 are placed with adequate clearance. Near the slots 20 on the circumference of the cutter 6 are bores for the three journal pins 22 for the location of the centrifugal blades 9.

The journal pins 22 of the illustrated embodiment have at their top end a head or collar 23 which is provided with a slot 24a in which a spring ring 29 for holding the three pins 22 engages.

The described mowing machine can be used as a side mower and as a rear mower. FIGS. 5 and 6 show the using of the device as a rear mowing machine in connection with a tractor 44. The carrier 1 is coupled to a carrying device and a suspension drawing device, which is located at the rear of the tractor and which is actuated by means of a hydraulic lift unit. The carrying device and drawing device for the carrier 1 comprises essentially a supporting frame 46 which is provided wtih coupling means (not shown) for mounting on the suspension of the tractor. The supporting frame 46 has the shape of a triangular carrier, whose lower arms are connected by a transverse member 37. The so-called tractor frame 49 is hinged at a point 48 on the supporting frame 46 and has, approximately at its center a stop 50 by means of which it can be held on the transverse member 47 in certain working positions of the mowing machine.

At its free end the tractor frame 49 carries the mower cutter bar or carrier 1, which in the operative position is also supported by the inside shoe 3 on the ground.

The cutter discs 6 are driven by means of a driving motor or from power take off belt pulleys 51, belts 52 and the schematically illustrated multiplication gear 4.

Near the inside shoe 3 the carrier or mower cutter bar 1 carries an intermediate lever 53. The latter is connected over a tension spring 54 to a fixed counter bearing 55, which is located on the tractor frame 49. A cable 56 is fastened to the end of the intermediate lever 53 which goes over a roller 57 located on the tractor frame 49 and is fixed to a change-over lever 58. This change-over lever 58 is a rocker arm which is located on a hinge pin 19 in a mounting 60 provided for this purpose on the supporting frame 46. Furthermore, a bearing block 61 is located on the tractor frame 49 which has on its end a lever 62 being hingeable connected with the intermediate lever 53 by means of a lever 63. The free end of the lever 62, finally, is connected at a point 65 by means of a tension spring 64 to the rocker arm 58. The suspension point 66 for the cable 56 is disposed on the rocker arm 58.

The carrying device and drawing device for the cutter carrier 1 has furthermore a protective covering 67 being pivotable in the direction of the horizontal longitudinal axis of the tractor and extending transversely over the carrier 1. Above the cutter discs 6 is a protective plate 67 which, by means of a support 68 is hinged to the tractor frame 49. Finally, the protective plate 67 and the carrier 1 are hinged to each other by the lever 69, the carrier 1, the tractor frame 49, the protective plate 67 and the lever 69 forming a four-membered coupling composed of the four members a, b, c and d. The individual members of the latter are arranged and adjusted in such a manner that in the working position according to FIG. 5 the protective plate 68 extends approximately parallel to the cutter carrier 1. In the raised transporting position according to FIG. 6 the protective plate 67 lies with its front end close against the cutter discs 6. Changing the protective plate 67 when changing from one position of the mowing machine to another one is not necessary. This protective covering 67 reduces considerably the danger of accidents through stones, lumps or soil, etc., thrown out by the cutter discs or the clearing and swath drums 16, which rotate at high speed especially in order to protect the driver of the tractor, provision is also made for the individual parts of the rods holding the protective plate 67 to be adjustable in length, so that the working distance between the protective plate 67 and the cutter carrier 1 is adjustable.

In the mowing position according to FIG. 5 the supporting frame 46 carried by the tractor hydraulics is held in the illustrated working height. The mower cutter bar on the carrier 1 rests on the ground and can be adapted to the contour of the ground by means of the tractor frame 49. The tension springs 54 and 64 are tightened. They release the carrier 1 as well as the inside shoe 3. The cable 56 hangs completely loose and releases in the adjusted position of the rocker arm 58.

If the mower cutter bar is to be brought into the so-called swath position i.e. if the carrier 1 and the inside shoe 3 are to be raised from the ground, then the supporting frame 46 must be raised to a certain extent by the tractor hydraulics. As a result of the load from the carrier 1 the tractor frame 49 is pivoted downwards about its suspension point 48, until finally the stops 50 lies against the transverse bar 47 mounted on the supporting frame 46. Prior to that the cable 56 has been tightened by the simultaneous further tightening of the tension springs 54 and 64. The cable 56 holds now the carrier 1 in the inclined position, which is necessary in order to move the carrier 1 and the forward shoe 3 over the cut material and over the cut swaths. Through lifting of the carrier 46 and 47 by means of the tractor hydraulics the entire mowing machine including the inside shoe 3 is raised to a certain extent from the ground by the stop 50.

In order to bring the mower cutter bar or the carrier 1 from the mowing or swath position into the transporting position according to FIG. 6, in which it is vertical, it is necessary to bring the entire mowing machine, that is to say including the supporting frame 46, from the position according to FIG. 5 into a position, where it is completely lowered to the ground. In this case the carrier 1 as well as the transverse member 47 of the supporting frame 46 rest on the ground surface. The tension springs 54 and 64 as well as the cable 56 are released to such an extent, that the rocker arm 58 can be manually moved without difficulty from the position according to FIG. 5 into a position pivoted through 180° according to FIG. 6. Thus the operative length of the cable 56 is shortened to a certain extent. Now the supporting frame 46 is slightly raised by means of the tractor hydraulics and hence the inside shoe 3 is also freed from the ground. Since the tractor frame 49 and the carrier 1 is tightened by the tension spring 54, the load of the mower cutter bar is effectively balanced, so that the carrier 1 can be gripped at the inside shoe 3 and easily brought into the vertical position according to FIG. 6. The fractor frame 49 can thereby be lowered in the supporting frame 46 to such an extent, that it lies with its stop 50 against the transverse member 47. Now the entire mowing machine can be pivoted into its highest position by means of the tractor hydraulics.

In all these operational steps the protective plate 67 essentially follows the movement of the carrier 1.

While we have disclosed several embodiments of the present invention, it is to be understood that these embodiments are given by example only and not in a limiting sense.

We claim:

1. A free cutting mowing machine adapted to be attached to a vehicle, as a tractor or the like, comprising a plurality of cutter discs, a carrier means having an inside and said carrier means having mounted thereon said cutter discs for rotation about vertical axes, knives secured to said cutter discs, a cutter disc drive means mounted on the inside of said carrier means, said carrier means includes forward extending projections below said cutter discs, each cutter disc being mounted on each projection, respectively, and each projection at its forward edge being limited semicircularly corresponding to the periphery of the respective cutter discs and such that substantially only said knives which are secured to said cutter discs project beyond said projections and said projections including lateral edges which are straight and parallel to each other in the direction of movement of said mowing machine and extending tangentially to said semi-circular forward edge.

2. The mowing machine, as set forth in claim 1, wherein:

said projections are provided next to one another on said carrier means and form spaces therebetween of a width substantially corresponding to the length of said knives.

3. The mowing machine, as set forth in claim 2 wherein:

said width of said spaces between said projections and the length of said knives mounted on said cutter discs are so adjusted relative to each other that the individual knives during their rotation extend beyond the periphery of the respective adjacent projection.

4. The free-cutting mowing machine, as set forth in claim 1, wherein:

said projections are developed as counter cutter members for the knives of the cutter discs arranged on adjacent projections.

5. The mowing machine, as set forth in claim 1, further comprising:

supportings for said cutter discs, drive gears operatively connected to said drive means and said cutter discs, said carrier means being formed as a flat hollow body and on all sides oil-tight sealed and receiving said drive means, said projections forwardly extend from said hollow body forming pockets enclosing said cutter disc supportings, said flat hollow body forming said carrier is formed with slot-like mounting apertures lying opposite said projections on the rear side of said carrier, covers releasably closing said mounting apertures, and said drive gears releasably mounted in said hollow body and insertable and removable through said mounting apertures.

References Cited

UNITED STATES PATENTS

| | | | |
|---|---|---|---|
| 2,625,784 | 1/1953 | Kelsey | 56—192 |
| 2,690,040 | 9/1954 | Miller et al. | 56—6 |
| 2,986,864 | 6/1961 | Young | 56—503 |
| 3,469,378 | 9/1969 | Heesters et al. | 56—25.5 |

ROBERT PESHOCK, Primary Examiner